United States Patent [19]

Zavracky et al.

[11] Patent Number: 5,490,034

[45] Date of Patent: * Feb. 6, 1996

[54] SOI ACTUATORS AND MICROSENSORS

[75] Inventors: Paul M. Zavracky, Norwood; Richard H. Morrison, Jr., Taunton, both of Mass.

[73] Assignee: Kopin Corporation, Tautnon, Mass.

[*] Notice: The portion of the term of this patent subsequent to Jan. 5, 2010, has been disclaimed.

[21] Appl. No.: 27,249

[22] Filed: Mar. 5, 1993

Related U.S. Application Data

[63] Continuation-in-part of Ser. No. 993,096, Dec. 18, 1992, which is a continuation of Ser. No. 847,690, Mar. 6, 1992, Pat. No. 5,177,661, which is a continuation-in-part of Ser. No. 526,166, May 21, 1990, Pat. No. 5,095,401, which is a continuation-in-part of Ser. No. 297,089, Jan. 13, 1989.

[51] Int. Cl.$^6$ .................................................. H01G 7/00
[52] U.S. Cl. .................. 361/283.4; 73/718; 29/25.41
[58] Field of Search .................. 361/280, 283.1, 361/283.2, 283.4; 29/25.41, 25.42; 177/210 C; 73/718, 715, 517 R

[56] References Cited

U.S. PATENT DOCUMENTS

| | | | |
|---|---|---|---|
| 3,758,830 | 9/1973 | Jackson | 317/234 |
| 3,893,228 | 7/1975 | George et al. | 29/580 |
| 3,938,175 | 2/1976 | Jaffe et al. | 357/26 |
| 4,003,127 | 1/1977 | Jaffe et al. | 29/580 |
| 4,040,172 | 8/1977 | Kurtz et al. | 29/580 |
| 4,208,782 | 6/1980 | Kurtz et al. | 29/580 |
| 4,222,815 | 9/1980 | Krechmery | 156/630 |
| 4,332,000 | 5/1982 | Petersen | 361/283 |
| 4,592,238 | 6/1986 | Busta | 73/727 |
| 4,665,610 | 5/1987 | Barth | 29/580 |
| 4,744,863 | 5/1988 | Guckel et al. | 156/653 |
| 4,783,821 | 11/1988 | Muller et al. | 381/173 |
| 4,808,549 | 2/1989 | Mikkor et al. | 27/20 |
| 4,812,801 | 3/1989 | Halvis et al. | 338/4 |
| 4,816,125 | 3/1989 | Muller et al. | 204/192.18 |
| 4,838,088 | 6/1989 | Murakami | 73/724 |
| 4,849,070 | 7/1989 | Bly et al. | 156/643 |
| 4,849,071 | 7/1989 | Evans et al. | 156/644 |
| 4,890,050 | 7/1989 | Evans et al. | 156/657 |
| 4,904,978 | 2/1990 | Barth et al. | 338/47 |
| 4,982,351 | 1/1991 | Kawate | 364/571 |
| 5,006,487 | 4/1991 | Stokes | 437/228 |
| 5,095,401 | 3/1992 | Zavracky et al. | 361/283 |
| 5,177,661 | 1/1993 | Zavracky et al. | 361/283 |
| 5,258,097 | 11/1993 | Mastrangelo | 156/644 |

FOREIGN PATENT DOCUMENTS

| | | |
|---|---|---|
| 0196784 | 8/1986 | European Pat. Off. |
| 63-250865 | 10/1988 | Japan. |
| 63-283171 | 11/1988 | Japan. |
| 1-136378 | 5/1989 | Japan. |
| 1-145872 | 6/1989 | Japan. |
| 2198611 | 6/1988 | United Kingdom. |

OTHER PUBLICATIONS

Sugiyama, S., et al, "Micro–Diaphragm Pressure Sensor," International Electron Devices Meeting, Dec. 7–10, 1986, Los Angeles, CA, pp. 184–187.

Tsaur, "SOI Technologies: Device Applications and Future Prospects", *Mat. Res. Soc. Symp. Proc.*, vol. 34, (1985), pp. 641–651.

Chen, "High–Quality Silicon–On–Insulator Films Prepared by Zone–Melting Recrystallization", pp. 43–51.

(List continued on next page.)

*Primary Examiner*—Bot L. Ledynh
*Attorney, Agent, or Firm*—Hamilton, Brook, Smith & Reynolds

[57] ABSTRACT

The present invention relates to the fabrication of diaphragm pressure sensors utilizing silicon-on-insulator technology where recrystallized silicon forms a diaphragm which may incorporate electronic devices used in monitoring pressure. The diaphragm is alternatively comprised of a silicon nitride having the necessary mechanical properties with a recrystallized silicon layer positioned thereon to provide sensor electronics.

25 Claims, 14 Drawing Sheets

OTHER PUBLICATIONS

Gieles et al., "Si Pressure Transducers", *Philips Tech*, Rev. 33 No. 1, pp. 15–20.

Craft et al., "Low Cost Sensors—A Market Overview", Description, pp. 1–3.

Swartz et al, "Silicon Pressure Transducer Technology for Automotive Applications".

Schuster et al., "Automotive Silicon Based Pressure Transducers For Fluid Power Applications", Publication, pp. 39–45.

Habekotté et al., "A Smart Digital–Readout Circuit For A Capacitive Microtransducer", *IEEE*, (Oct. 1984), pp. 44–54.

Wise, "Integrated Sensors: Interfacing Electronics To A Non–electronic World", *Sensors and Actuators*, 2 (1982) pp. 229–237.

Obermier, "Polysilicon layers Lead To A New Generation of Pressure Sensors", *IEEE*, (1985), pp. 430–433.

Guckel et al., "Planar Processed Polysilicon Sealed Cavities for Pressure Transducer Arrays" *IEDM*, (1984) pp. 223–225.

Giachino, "Smart Sensors", *Sensors and Actuators*, 10 (1086), pp. 239–248.

Berh et al., "Miniature Silicon Capacitance Absolute Pressure Sensor".

Sugiyama et al., "Micro–Diaphragm Pressure Sensor", *IEEE*, (1986) pp. 184–187.

Bryzek, "Modeling Performance of Piezoresistive Pressure Sensors", *IEEE*, (1985) pp. 168–173.

Ko et al., "A High–Sensitivity Integrated–Circuit Capacitive Pressure Transducer", *IEEE*, (Jan. 1982) vol. ED–29, No. 1 pp. 48–56.

French et al., "Piezoresistance in Polysilicon" *Electronics Letters* Nov. 22, 1984 vol. 20 No. 24, pp. 999–1000.

Spencer et al., "A Theoretical Study of Transducer Noise in Piezoresistive and Capacitive Silicon Pressure Sensors", *IEEE*, (Aug. 1988) vol. 35, No. 8, pp. 1289–1298.

Hijab et al. "Micromechanical Thin–Film Cavity Structures For Low Pressure and Acoustic Transducer Applications" *IEEE* (1985) pp. 178–181.

Guckel et al., "Fabrication Techniques For Integrated Sensor Microstructures", *IEEE* (1986) pp. 176–179.

Detty et al., "A Comparison of Piezoresistance in Polysilicon, Laser Recrystallized Polysilicon and Single Crystal Silicon", *IEEE* (1985) pp. 278–280.

5,490,034

SOI ACTUATORS AND MICROSENSORS

RELATED APPLICATIONS

This is a continuation-in-part application of U.S. Ser. No. 07/993,096 filed on Dec. 18, 1992, which is a continuation of U.S. Ser. No. 07/847,690 (now U.S. Pat. No. 5,177,661) filed Mar. 6, 1992, which is a continuation-in-part application of U.S. Ser. No. 07/526,166 (now U.S. Pat. No. 5,095,401) filed on May 21, 1990, which is a continuation-in-part application of U.S. Ser. No. 07/297,089 filed on Jan. 13, 1989.

BACKGROUND OF THE INVENTION

The present invention relates to the field of pressure sensors, and more particularly to the field of diaphragm sensors using silicon-on-insulator (SOI) technology.

The use of pressure sensors or transducers has found numerous applications in a variety of fields in which it is desirable to monitor fluid flow, liquid level or pressure. The electronics industry has attempted to accommodate the need for low-cost and dependable sensors by utilizing integrated circuit (IC) fabrication techniques in the design and manufacture of microfabricated diaphragm transducers on IC chips. The basic types of silicon pressure transducers include (1) piezo-junction devices, (2) piezoresistive sensors, and (3) capacitive pressure transducers.

Piezoresistive sensors have been formed in polycrystalline silicon, laser recrystallized silicon and bulk single crystal silicon. The resistors have been fabricated by dopant implantation followed by annealing and metallization. The diaphragm of the sensor has been separately formed by patterning a silicon wafer with an oxide insulator, depositing polycrystalline silicon over the insulator/wafer surface and removing the oxide from between the diaphragm and the wafer.

A microfabricated capacitive pressure transducer is formed, for example, by diffusing a dopant into a region in a silicon wafer that serves as a lower electrode, and forming a compliant diaphragm of polysilicon as a second electrode that is separated from the diffused region by an oxide spacer. The oxide spacer can be removed by etching through an opening in the backside of the wafer. See R. S. Hijab and R. S. Muller, "Micromechanical Thin-Film Cavity Structures For Low Pressure and Acoustic Transducer Applications," IEEE, CH 2127, 178, September, 1985.

SUMMARY OF THE INVENTION

A method of forming a microfabricated pressure sensor in which a compliant membrane is formed that encloses a sacrificial insulating material. The insulating material is subsequently removed through an opening in the membrane to form a pressure sensitive diaphragm. Electrical elements are positioned in a single crystal silicon layer formed on or in the diaphragm to detect movements thereof and produce electrical signals proportional to the diaphragm displacement. The single crystal layer is formed by depositing a polycrystalline silicon layer and then zone-melt recrystallizing the film to form a high quality single crystal silicon suitable for CMOS circuitry.

The method can be used to form both silicon and silicon nitride diaphragm pressure sensors. An oxide is formed on a semiconductive wafer such as silicon using a local oxidation of silicon (LOCOS) planar process. A silicon nitride or polysilicon layer is formed over a region of the oxide. Electrical elements such as piezo-resistors are formed over the nitride or silicon layers respectively and one or more holes are etched through the layer to permit removal of the oxide spacer with a suitable etchant. Removal of the oxide insulator forms a cavity between the nitride or silicon layer such that the layer forms a diaphragm that is highly sensitive to pressure variations to which the diaphragm is exposed. The holes or openings in the diaphragm are then sealed. The displacement of the diaphragm and the resulting electrical signals generated by piezo-resistors is directly correlated with changes in pressure. Any suitable transducer can be formed in the diaphragm structure, or alternatively, a capacitive type of transducer can be formed using electrodes formed in the diaphragm and the silicon wafer. Implanted piezo-resistors can be formed in a standard Wheatstone bridge arrangement used in microsensor systems. Other integrated circuits, driving elements or signal processing circuits can be fabricated in the recrystallized material to produce so-called "smart" microsensors.

A number of additional features can be integrated with "smart" microsensor systems such as selfcalibration, system diagnostics, and redundant systems.

The removal of the LOCOS oxide to produce a silicon diaphragm is accomplished by performing an anisotropic etch, for instance, preferably in the center of the diaphragm, to expose a small surface area of the oxide. An oxide etch is applied through the opening in the diaphragm which removes the underlying oxide. Where the diaphragm is comprised of a silicon nitride, one or more holes can be formed along the periphery of the diaphragm to expose a portion of the underlying oxide.

The above, and other features of the invention including various novel details of construction and combination of parts, will now be more particularly described with reference to the accompanying drawings and pointed out in the claims. It will be understood that the particular method of fabricating silicon-on-insulator pressure sensors embodying the invention is shown by way of illustration only and not as a limitation of the invention. The principal features of this invention may be employed in various embodiments without departing from the scope of the invention.

DETAILED DESCRIPTION OF THE INVENTION

The silicon diaphragm pressure sensor of the present invention is the simplest type to fabricate in SOI technology. The ISE (isolated silicon epitaxy) process described below produces a film that is ideal for sensor applications, particularly because it can produce a diaphragm under very slight tensile stress. ISE technology is based upon existing processes known as lateral epitaxy by seeded solidification (LESS) and zone-melt recrystallization (ZMR). U.S. Pat. No. 4,371,421 entitled "Lateral Epitaxial Growth by Seeded Solidification" describes these processes in greater detail. The ISE process has produced wafers of semiconductor material having low defect density, low warpage and no measurable impurities. Since the ISE material is extremely high quality, piezoresistors fabricated in this material to produce SOI microsensors have properties as good as, or exceeding those obtainable with bulk materials.

FIG. 1 is a process flow diagram illustrating the fabrication of a silicon diaphragm pressure sensor. Silicon oxide grown using a high temperature LPCVD process is deposited on a silicon wafer 10 and patterned into an array of rings 12 which will ultimately represent the perimeter of the diaphragms. One such ring 12 is shown in the cross-sectional view of FIG. 1A (with background sections removed for clarity). Each ring 12 need not necessarily be circular in shape, but could be square or some other shape. Note, however, that the preferred embodiment produces a circular diaphragm.

Figure 1A:
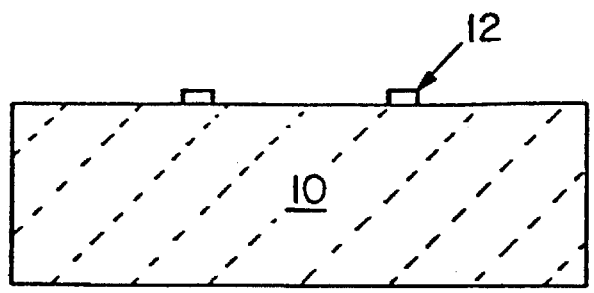
FIGS. 1A–1E illustrate, in a series of cross-sectional views, the steps used in the fabrication of a silicon diaphragm pressure sensor of the present invention.
Figure 1B:
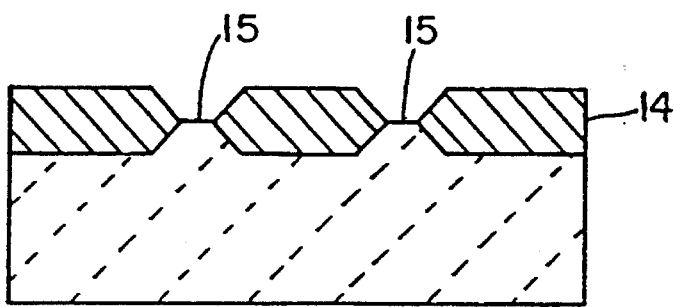
Figure 1C:
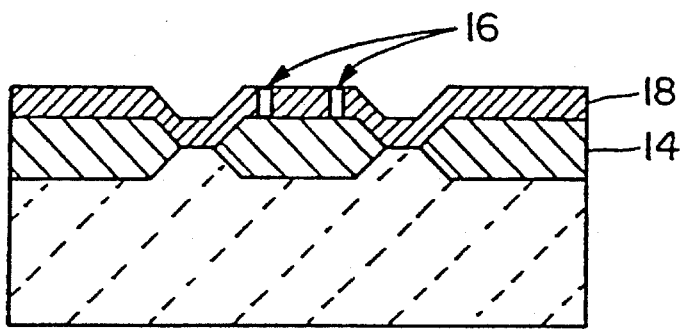

A layer 14 of oxide is then grown on the exposed silicon by a local oxidation of silicon planar process. In this process, the nitride ring 12 acts as a mask and prevents the growth of oxide on the silicon surface beneath the nitride. This process is often referred to as LOCOS, for local oxidation of silicon (FIG. 1B). After LOCOS, the nitride ring 12 is stripped down to the silicon to form a support surface or ring 15 and a high purity polysilicon layer 18 is then deposited by LPCVD (liquid phase chemical vapor deposition) over the entire wafer (FIG. 1C).

The polysilicon layer 18 is now capped with another silicon oxide film (not shown) and subjected to zone-melt recrystallization (ZMR). This process, which is described below in greater detail, converts the polysilicon 18 to a thin film layer of high quality single crystalline silicon. This layer 18 is suitable for the fabrication of high density CMOS circuits and, in particular, for the fabrication of piezoresistive elements 16. These devices 16 and other additional circuits are fabricated in the ISE layer 18 at this point, using standard SOI circuit fabrication technology.

A preferred embodiment of the present method utilizes zone-melt recrystallization, however, other types of crystallization procedures such as laser recrystallization, can also be used. One type of system for zone-melt recrystallization uses a scanning line heating source that is translated across the material to be recrystallized and a second heating system to raise the temperature of the entire sample close to the melting point of the material. As the line heater is activated, it induces melting of a zone in the sample directly beneath the heater. The line heater is then translated across the surface of the sample causing the melted zone to move in unison with the heater. As the melted zone moves past a portion of the sample, the melted sample solidifies and results in lateral epitaxial growth of a single crystal structure. The diaphragm that results may be a simple layer or a multi-layered structure which includes the recrystallized film. The diaphragm is secured along its periphery, either directly to the substrate material or to intermediate layers which partially enclose the cavity in which the diaphragm moves.

Figure 1D:
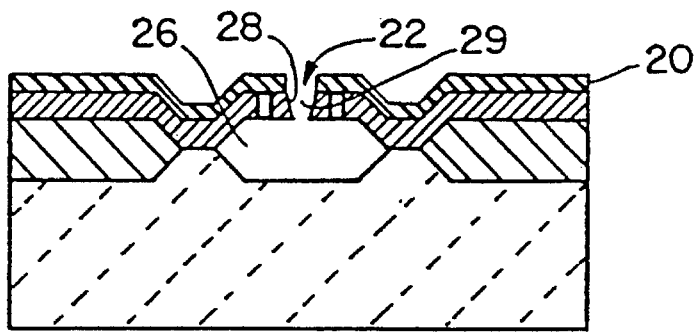

After circuit processing, the wafer is coated with a second silicon nitride (or oxide) layer 20 for passivation and to protect the circuitry during subsequent processing. As shown in FIG. 1D, the nitride is patterned and the silicon diaphragm 18 is anisotropically etched to form a pit or opening 22 which exposes a small portion of the underlying oxide. This step is critical as the opening 22 in the diaphragm needs to be kept as small as possible, perhaps only a fraction of a micron, so that it can easily be sealed later on. Preferably more than one opening can be used to simplify oxide removal, however, only one is illustrated here. An anisotropic silicon etch is employed to form the opening 22 in order to ease the lithographic stress. This etchant forms etch pit sidewalls 28 and 29 which slope at about 55°, gradually narrowing with depth. Therefore, the pit will be wider at the top than at the bottom. This structure results in a more stable seal in which the sidewall geometry prevents movement of the sealing material into the sensor cavity. Note that while the opening 28 is located in the center of the diaphragm, other locations in the diaphragm can be used.

At this point, the wafer will be exposed to a concentrated HF etchant which attacks the silicon oxide 26, even through very small holes. Once the oxide is consumed, the HF exits the cavity 27 due to surface energy considerations. Only the oxide under the diaphragm is etched since it is completely isolated by the ring 15 from the surrounding oxide layer (FIG. 1D).

Figure 1E:
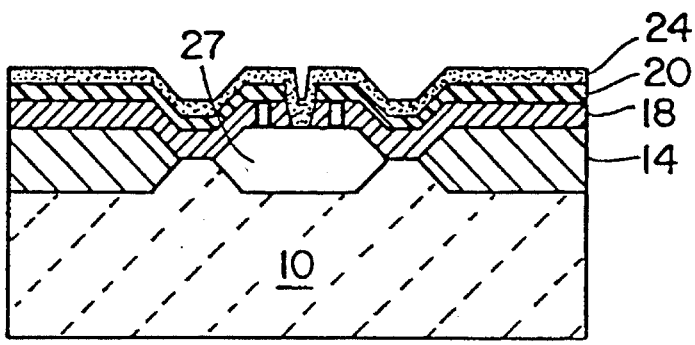

Finally, the hole in the diaphragm is sealed with a layer 24 of material using an LPCVD process (FIG. 1E). Any number of materials could be deposited including: TEOS (Tetraethyloxysilicate), a low temperature oxide, a silicon nitride, polycrystalline silicon, etc. Alternatively, thermal oxidation could be used to seal the hole. This layer 24 may be patterned to limit its extent and therefore its effect on the properties of the diaphragm. Existing silicon diaphragm sensors have tended to remove the oxide spacer either through an opening in the substrate, or laterally from the side of the diaphragm. The present device opens the moving portion of diaphragm to remove the oxide and then seals the opening. This structure operates to shift the stress experienced by the diaphragm in a manner that can enhance sensor performance depending upon the specific operating conditions. The sealing material 24 can thus function as a "stress riser" by locating the resistors 16 at locations of higher stress in the diaphragm by using specific patterns of the material 24.

Figure 4:
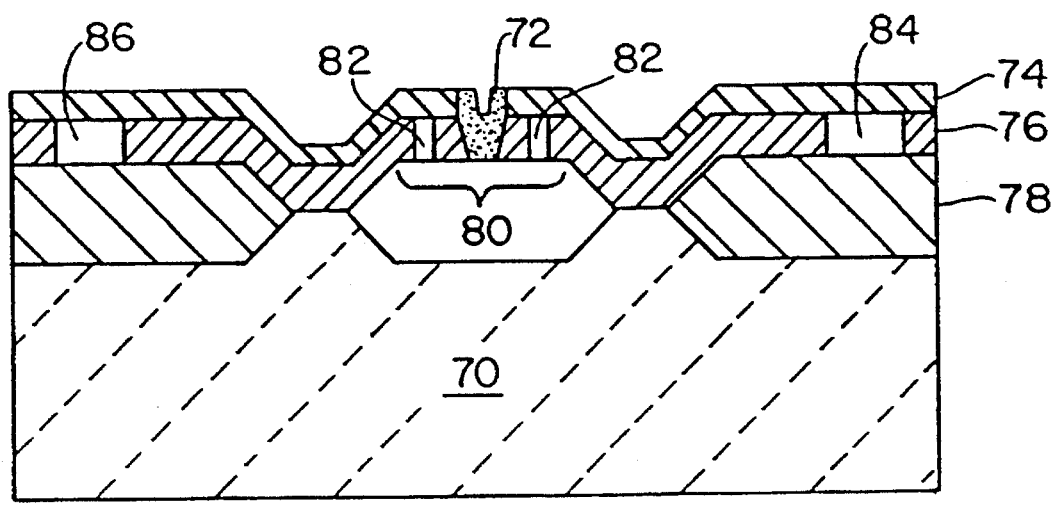
FIG. 4 illustrates in a cross sectional view a preferred embodiment of a silicon diaphragm pressure sensor having a patterned channel sealant.

For example, FIG. 4 shows a sensor having a substrate 70, an oxide insulator 78, a single crystal diaphragm 80 located in the recrystallized layer 76 having two or more piezoresistive elements 82, a nitride cap 74, and a patterned sealant 72. The sealant 72 has a stiffness greater than the silicon of the diaphragm 80 so that as the diaphragm 80 is displaced under pressure, the silicon portions of the diaphragm 80 will undergo greater strain. The piezoresistive elements 82 will thus experience greater stress than would normally occur.

FIG. 4 also illustrates the introduction of additional electronic components 84 and 86 into the recrystallized layer 76 adjacent the diaphragm 80. The components 84 and 86 could be used to introduce higher levels of circuit functionality into the sensor to provide, for example, self-calibration of the sensor, diagnostic or computational capabilities, compensation for non-linear characteristics or communication with other systems. Also due to the small size of each sensor, a number of sensors could be used to provide redundancy, where the failure of any one sensor could be detected and its output electronically rejected.

Figure 2A:
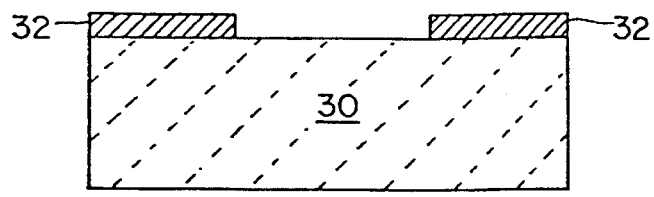
FIGS. 2A–2F illustrate the steps used in the fabrication of a nitride diaphragm pressure sensor of the present invention.
Figure 2B:
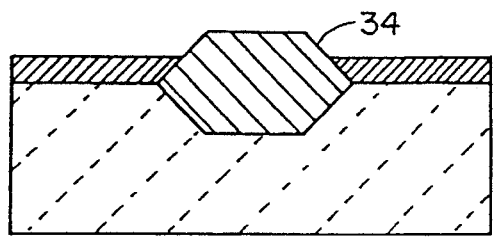

A silicon nitride diaphragm pressure sensor could be fabricated using a process flow similar to the one described above. As illustrated in FIGS. 2A–2F, the process sequence starts with a patterned silicon nitride 32 formed on a silicon wafer 30, and a LOCOS oxide 34, which in this case defines the region which will eventually be under the diaphragm (FIGS. 2A and 2B).

Figure 2C:
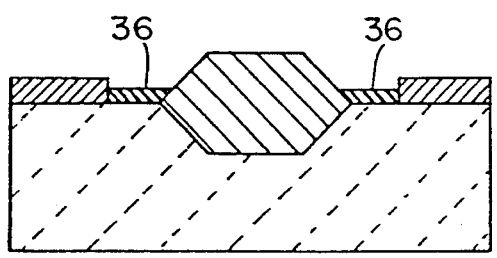

In FIG. 2C, the nitride 32 has been repatterned and etched back away from the oxide area 34 to create a greater perimeter around the diaphragm. The wafer is again oxidized but this time to a much lesser extent, perhaps as little as 2000 A, to form a thin peripheral layer 36 through which the LOCOS oxide is later removed. The silicon nitride, which forms the diaphragm material, is now deposited as layer 38. This must be a high quality silicon nitride layer and is likely to be deposited using an LPCVD process. This nitride diaphragm must have the appropriate mechanical properties including a controlled thickness so that a well-defined relationship exists between applied pressure and the resulting displacement or strain of the diaphragm.

Figure 2D:
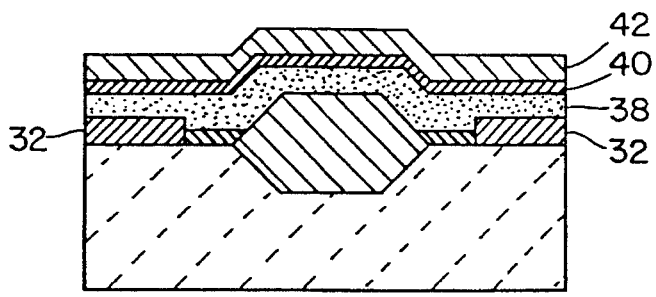
Figure 2E:
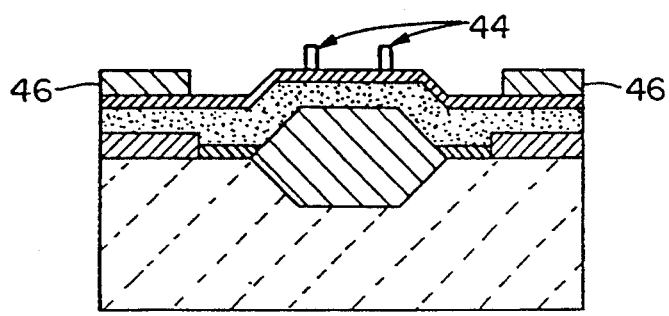

In FIG. 2D, the nitride is capped with a thin oxide layer 40. This oxide layer 40 can be deposited using any number of techniques or may be thermally grown on the nitride. This layer 40 serves to protect the polysilicon from the nitride during the recrystallization step. Next, polysilicon is deposited, capped and zone-melt recrystallized to form a single crystal silicon layer 42. The capping layer must be removed (not shown) prior to fabrication of device elements. In FIG. 2E, the resistors 44 are patterned and any additional electronics are fabricated in the recrystallized silicon 46 that remains around the periphery of the diaphragm.

Figure 2F:
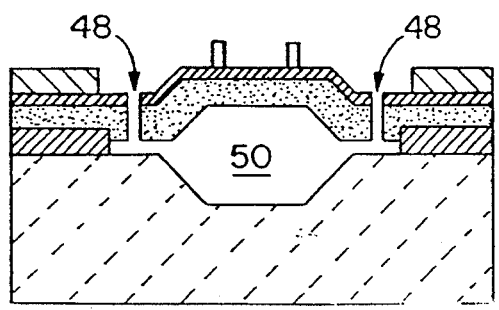

Holes 48 are then etched down to the thin oxide layer 36 as shown in FIG. 2F. These holes provide a path for the subsequent HF etch, which will be used to remove the oxide 34 from beneath the diaphragm to form cavity 50. The sensor is completed when a passivation layer is deposited and the etchout holes sealed.

Figure 3:
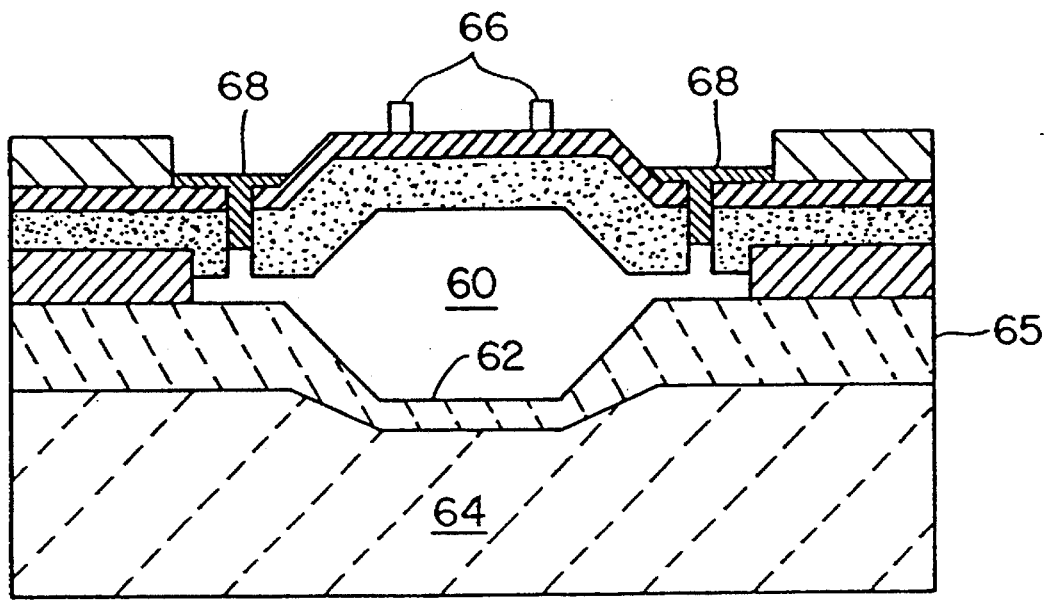
FIG. 3 illustrates in a cross sectional view a sealed silicon nitride sensor with an electrode implanted in the substrate to provide a capacitive transducer.

If the sensor is to be a capacitive type, the resistors would be replaced with a counter electrode and a substrate contact is used to provide the capacitive transducer. FIG. 3 illustrates a capacitive type transducer in which a dopant is implanted in the wafer 64 in layer 65 prior to diaphragm fabrication to form an electrode 62 in the substrate underneath the cavity 60. The holes have been sealed using a deposited silicon nitride 68 or any of the processes referenced above in connection with FIG. 1E. The electrodes 66 serve as counterelectrodes in the capacitive circuit.

Calibration of a sensor is essential to its proper performance. The usual approach is to connect the sensor to a calibration standard and to adjust the zero (or offset) and full-scale (or gain) values by first applying a minimum pressure level and adjusting the zero, and then applying a maximum pressure level and adjusting the span. In traditional sensors, this involves either adjusting potentiometers or trimming resistors which are components in the amplification circuit. A preferred embodiment of the present sensor uses a programmable memory to store information about the zero and span. With this type of sensor one can readjust the values after the sensor has been in use for a period of time and may have drifted out of calibration. This readjustment can be performed without removing the sensor from its location. This provides greater serviceability for the system.

A further embodiment employs a sensor having circuitry that can perform self-diagnostic functions. This capability provides information such as whether the device is either shorted or open. In this event, any error can be compensated for in a sensor system having redundancy. The sensors can be extremely small with diameters in the tens of microns so that many sensing elements can be associated with one sensor chip. If one sensor fails, the error is reported and a new sensing element is brought on-line.

With sufficient computational power, the sensor can take environmental effects into consideration. For example, piezoresistive pressure sensors are well known to have significant temperature coefficients. Normally, the current through the sensing bridge is used to compensate for the temperature dependence of the pressure reading using an analog circuit. With the present sensors, environmental effects are compensated for during calibration. Even a very non-linear environmental effect is corrected by providing the sensor with a programmed process and tabulated data which describes the effect. This method can also be applied to the intrinsic non-linearity of the sensing element itself. In both the capacitive and piezoelectric type sensors, the output is not a linear function of the applied pressure which can be corrected using this procedure.

Communications in a noisy environment can be a problem for sensor applications. Incorporating digital communication components, particularly microprocessor based circuits, can provide the best combination of noise immunity and error detection possible.

In a preferred method of fabrication, the materials and processes found in a typical integrated circuit fabrication can be used to make microsensors. These sensors are therefore "compatible" with the integrated circuit fabrication process.

Polysilicon has been employed as the diaphragm material in one embodiment. Polysilicon is normally used in conjunction with gates in CMOS and NMOS circuits. A significant problem to be addressed with the use of this material was the internal stress in the polysilicon. To solve this problem, careful analysis of the deposition conditions was conducted and the appropriate conditions determined for the deposition of polysilicon with a slight tensile stress. Diaphragms with a tensile stress tend to stretch themselves taut while diaphragms with compressive stress will buckle. Both piezoresistive and capacitive pressure sensors have been fabricated having diaphragms under tensile stress.

Figure 5:
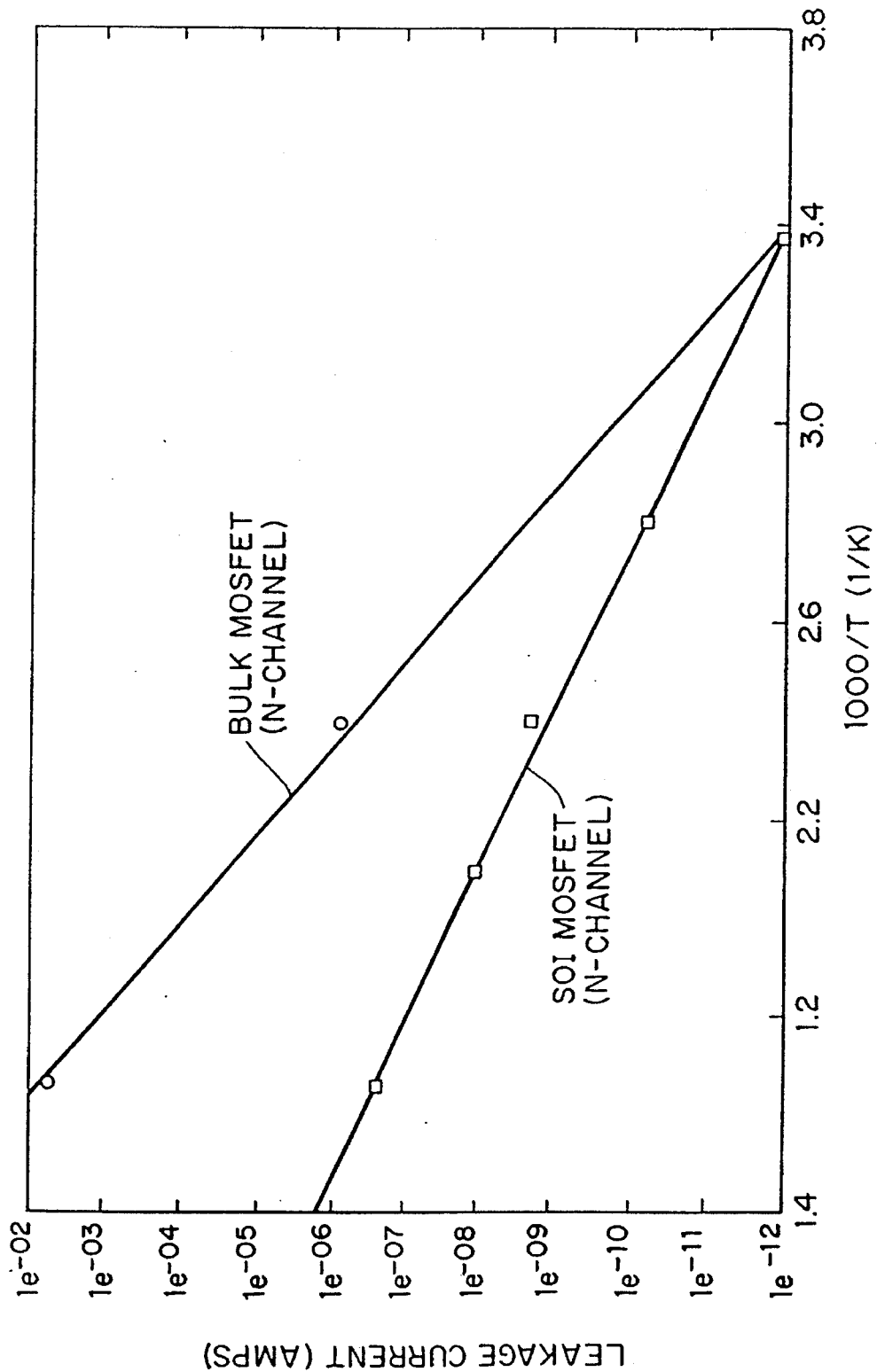
FIG. 5 is a graphical illustration plotting the leakage current versus the inverse temperature for both bulk and SOI MOSFETs.

As indicated previously, the devices of the present invention can be fabricated in SOI using conventional CMOS fabrication techniques. These devices have demonstrated substantially better high temperature characteristics than equivalent bulk devices. SOI wafers have excellent characteristics for use as a high temperature material due to its good crystal quality and high purity. Measurements on large (gate width to length ratio W/L=400/10) enhancement mode MOS transistors have indicated much lower leakage current for devices fabricated in SOI wafers versus equivalent devices fabricated in bulk silicon. FIG. 5 shows a plot of the leakage current versus inverse temperature for both a bulk device and an SOI device. The significant improvements in the leakage current obtained for SOI device provide important advantages for sensors fabricated with SOI material including high temperature operation of sensors and associated circuitry, CMOS compatible processing, simple sensor fabrication, much smaller size compared to conventional sensor technologies, redundancy of sensor elements, capability of multiscale sensor arrays, and ease of integration with circuits.

Capacitive sensors offer better temperature performance and better pressure sensitivity than piezoresistive devices. In order to take advantage of capacitive devices, it is important to place signal conditioning electronics near the devices themselves. This is because the capacitance of a microfabricated pressure sensor is very small. If the electronics are remote from the sensor, stray capacitance associated with the leads and noise induced by the environment degrade the signal from the sensor. With piezoresistive type pressure sensors, the measurement has better immunity to noise, especially for small devices, but piezoresistive devices are very temperature sensitive (in fact the temperature coefficient can exceed the piezoresistive coefficient by an order of magnitude).

Figure 6:
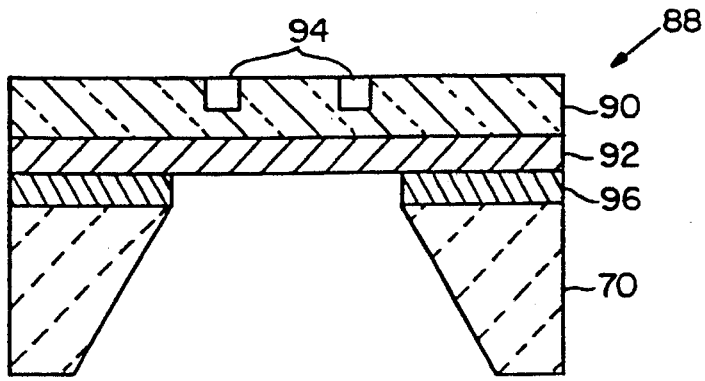
FIG. 6 is a cross-sectional view illustrating the use of an underlying oxide as an etch stop.

The simplest and most straight forward application of SOI material is to employ the underlying oxide as an etch stop. FIG. 6 shows the application of an etch stop 96 to a anisotropically etched piezoresistive pressure sensor 88. In order to fabricate this type of sensor, a typical process might start with the deposition of epitaxial silicon 90 onto a crystallized layer 92. The deposition increases the thickness of the layer to the desired value and than permits electronics and piezoresistor 94 fabrication. In order to obtain the high temperature performance possible with SOI materials, the transistors and electrical devices that are used in the amplification circuit need to be isolated from one another. After the electronic components have been fabricated and metallization defined, the wafer is coated with a silicon nitride layer. Silicon nitride is extremely resistant to KOH etching and can act as an encapsulant for the final product. Other anisotropic etchants could be used such as EDP or Hydrazine. The back side of the wafer is now patterned and the nitride removed in the areas to be etched. Special alignment equipment is required to make sure that the front and back surfaces are registered properly. After anisotropic etching, the oxide is removed from the back of the diaphragm. This will improve the performance of the diaphragm, since silicon oxide layers are under significant stress. The wafer is completed by opening wirebond windows in the silicon nitride.

Figure 7:
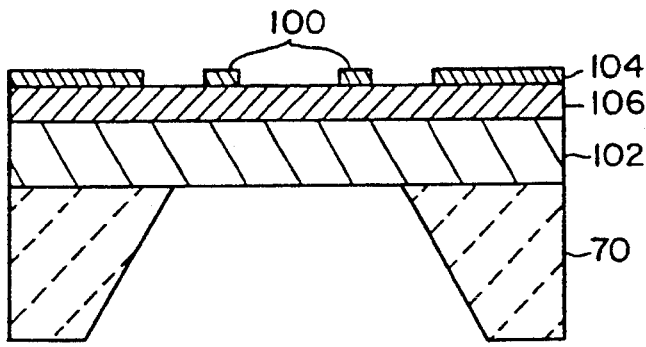
FIG. 7 is a cross-sectional view illustrating the use of an oxide layer to fully isolate the sensor elements and electronics.

FIG. 7 shows a modification of the process to provide fully isolated piezoresistors 100. In this case, a silicon wafer 70 with an epitaxial layer 102 is used as the starting material. An SOI wafer is then formed from this substrate having silicon oxide layer 106 and crystallized layer 104. The epitaxial layer, typically formed of single crystal silicon, is chosen to be the thickness of the desired diaphragm. It is also chosen such that its dopant type will be different from that of the wafer. In this way, several known etch stopping techniques can be employed such as stopping on a p+ layer or an n-layer using an electrochemical etchant. The crystallized silicon 104 is now used to form the resistors 100 and other electronic devices required. Full isolation of the resistors and the electronics is the result.

Figure 8:
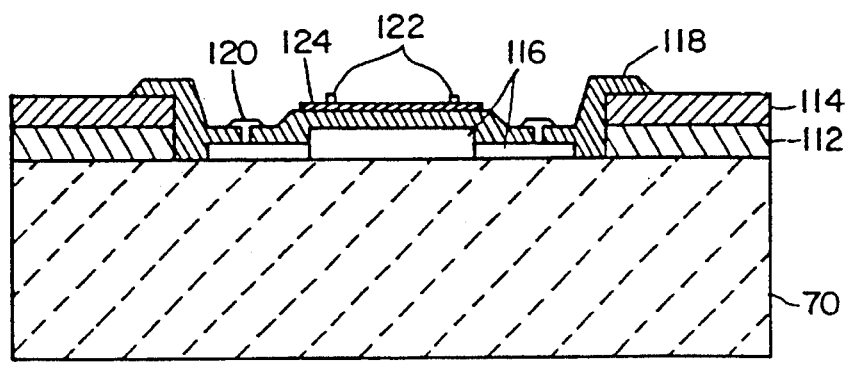
FIG. 8 is a cross-sectional view of a sensor suspended using a polynitride structure.

FIG. 8 shows one embodiment in which SOI wafers can be used to create high temperature pressure sensors. In order to fabricate such a device, first etch through both the epitaxial layer 114 and the lower oxide 112 in order to define the area which will become the diaphragm. Next, the epitaxial region above this area is removed and the wafer is oxidized and patterned. Next the CVD diaphragm 118 is deposited and defined. If the sensor is to be a piezoresistive type, then a second polysilicon layer must be deposited and defined over silicon oxide layer 124. Electronics 122 and metallization follows and the final step is to etch out the cavity 116 by cutting holes in the CVD layer 118 outside the perimeter of the diaphragm and to etch the underlying oxide layer. The holes are then sealed using an additional thermal oxidation process or by depositing a CVD sealing layer 120 or both. In this approach, a capacitive pressure sensor would involve fewer processing steps.

Figure 9:
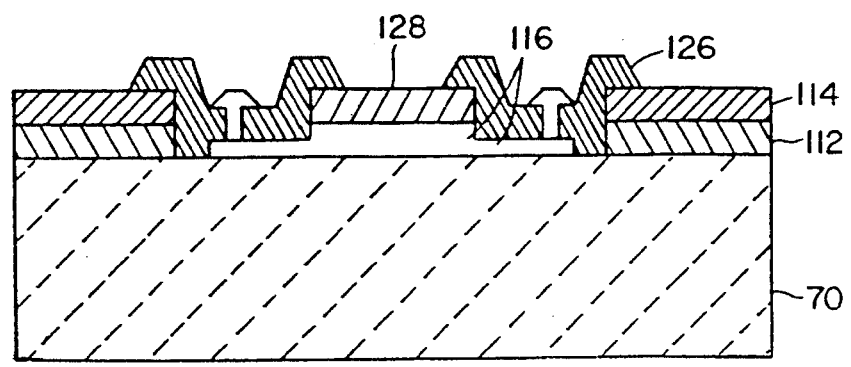
FIG. 9 is a cross-sectional view of a preferred embodiment in which the epitaxial layer is used as the sensor diaphragm.

FIG. 9 shows another similar approach in which the epitaxial layer 114 is used as the silicon diaphragm 128 for a capacitive pressure sensor. In this approach, a CVD deposited nitride layer 126 is used to support the 128 diaphragm from above rather than below. All other processing steps are the same as outlined above.

It should be noted that if electrical isolation of the diaphragm is required, additional insulating layers can be employed, or the CVD layers must be electrically insulating. In addition, etched cavities can be accessed from both the back and front surfaces if the silicon wafer 70 were etched from behind as is the case for etch cavity type pressure sensors.

Figure 10:
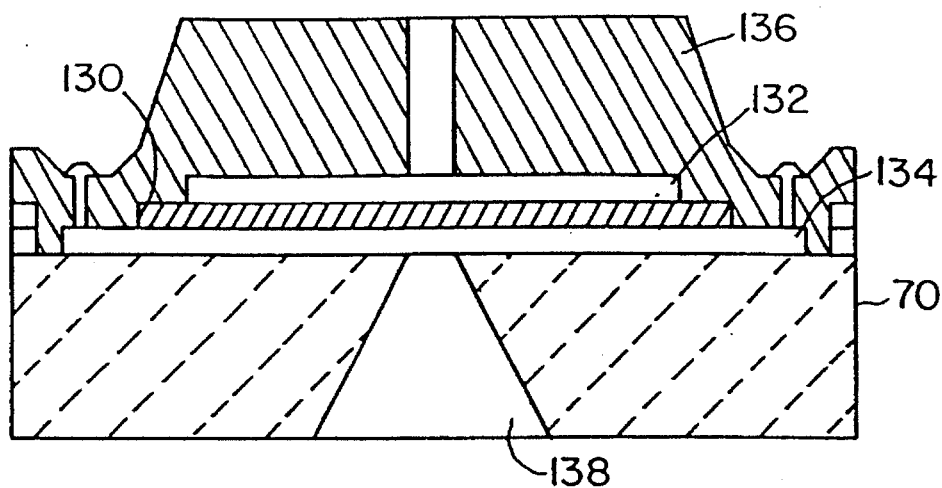
FIG. 10 is a cross-sectional view of a differential pressure sensor.

A further embodiment employing the concepts described above, FIG. 10 shows a differential pressure sensor with both a lower and upper overpressure stop. The upper cavity 132 can be created with a deposited oxide 136 or other sacrificial layer. As in the previous example, the silicon diaphragm 130 is formed from the epitaxial layer. Access to the diaphragm is achieved from both sides of the resulting die. Thus, a lower cavity 134 can be accessed through a rear opening 138 in substrate 70.

Figure 11:
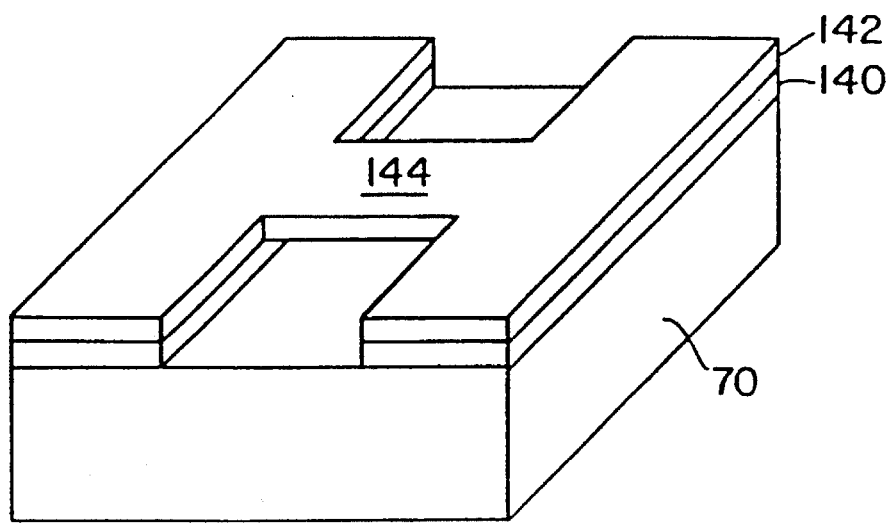
FIG. 11 is a perspective view illustrating an epitaxial bridge structure.

For applications other than pressure sensors, wafers allow simple micromachining of mechanical structures. As shown in FIG. 11 the underlying oxide can be used as a sacrificial layer for such structures as single crystal silicon bridges 144 formed from epitaxial layer 142 and double tuning forks, and for cantilever structures such as accelerometers.

One of the advantages of the technology described herein is the ability to use alternate underlying insulating layers or multiple underlying layers. These insulating layers can be chosen to have properties that are suitable as mechanical materials or can be chosen to become sacrificial.

Figure 12:
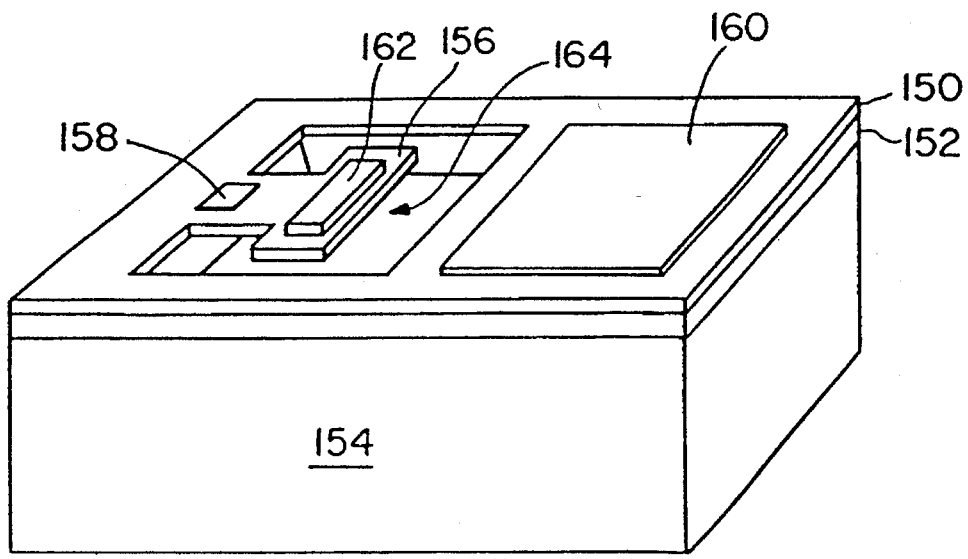
FIG. 12 is a perspective view illustrating a cantilever sensor structure.

A simple example of the use of alternate layers is shown in FIG. 12. A silicon nitride layer 150 is used in place of the lower oxide. Silicon nitride is known to have good mechanical properties for microsensors. In this case, the nitride 150 is used as the material from which a cantilevered accelerometer 156 is formed. A piezoresistive element, a diode, or an active device can be used as a stress detector 158 at the base of the cantilever 156 and can be fabricated in a mesa created in the epitaxial layer. High temperature electronics 160 are fabricated in this layer and in close proximity to the sensing element. To free the cantilever from the substrate, an anisotropic etchant is used. This etchant undercuts the cantilever structure at a rapid rate while stopping at the edges of the defined area. A mass 162 can be secured to cantilever 156 to define its mechanical characteristics.

Typical micromachined accelerometers are etched from Si wafers and can typically be about 0.35–0.5 cm on a side and 200–300 microns thick. For reliability this mass is supported, in one embodiment with 4 springs that are integral to the sensor. These springs have diffused resistors that sense the motion of the mass.

By using materials with higher densities than silicon, a microaccelerometer can be manufactured without the lengthy micromachining currently used. Such a material is tungsten (W) with a density of 19.4 (which is roughly 10 times that of silicon), the thickness being reduced by a factor of 10 and still having the same mass. The area would increase to 0.5 cm on a side. A 20 micron layer of W can be selectively deposited using chemical vapor deposition.

The frequency of the accelerometer can be expressed by the following equation:

$$f_o = \frac{1}{2\pi} \sqrt{\frac{K}{Mass}}$$

The frequency, $f_o$, is inversely proportional to the mass but follows the spring constant K. The stiffness of the supporting members determines K. For a typical accelerometer, the springs are 20 microns thick and 80–100 microns long. A ISE accelerometer has springs in the range of 1–2 microns thick. When this thickness can support the high stresses seen by the springs, the accelerometer has a sensitivity of:

$$Sensitivity = B \frac{Mass}{K}$$

Note that the spring constant K has an inverse relationship to the sensitivity. The thinner springs will have a lower K value. B is the transduction efficiency and is a function of the resistors. Such thin springs yield very high B values and very low K values and thus enhance the overall sensitivity.

Multiple springs can be employed to give the device survivability. This can increase the resonant frequency and thus decrease sensitivity.

Figure 13:
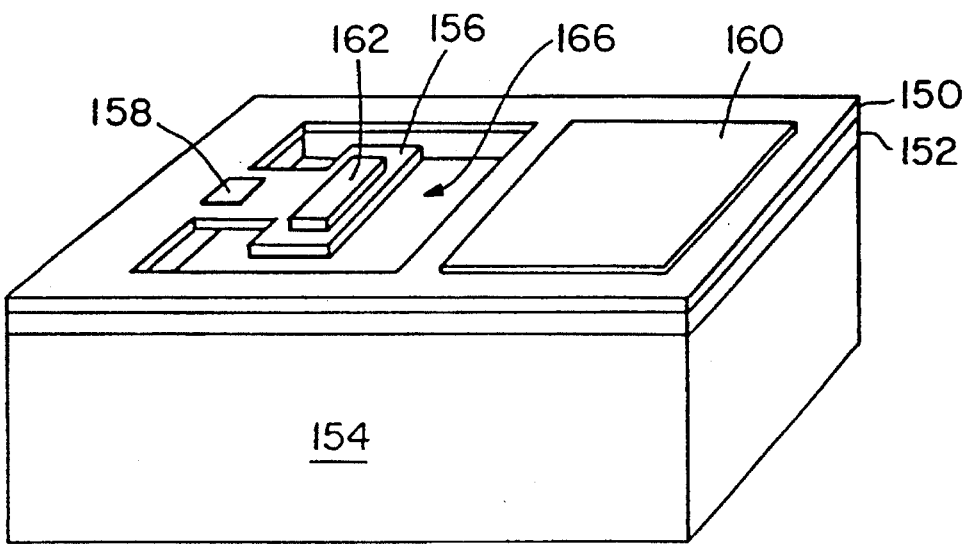
FIG. 13 is a perspective view illustrating an alternate method of fabricating the cantilever structure.

The use of more than one lower insulating layer provides even greater advantages. Another accelerometer is shown in FIG. 13. In this case, the lower insulator consists of a layer of oxide 152 upon which a layer of silicon nitride 150 has been deposited. The epitaxial layer is again patterned into mesas for the sensing elements 158 and electronics 160. Afterwards, the nitride is patterned and the oxide etched to undercut the nitride and free the cantilever from the substrate. If undercutting of the boundary layer is a problem in a given application, one could resort to a double masking. This involves depositing a masking material. In this case, the masking material is a deposited oxide. This layer is patterned to the desired final nitride profile. A second photoresist step provides a mask whose openings are smaller than those of the final nitride profile. Both the nitride 150 and the oxide 152 are etched 166 using a plasma technique. Prior to removing the photoresist, the underlying oxide 152 is etched from beneath the cantilever. This will remove the perimeter of the cavity as well. The photoresist is now removed and the silicon nitride 150 is again etched using the upper oxide as a mask. If the mask set is properly designed, the nitride 150 can be cut back such that the undercutting from the original oxide is completely compensated.

Figure 14A:
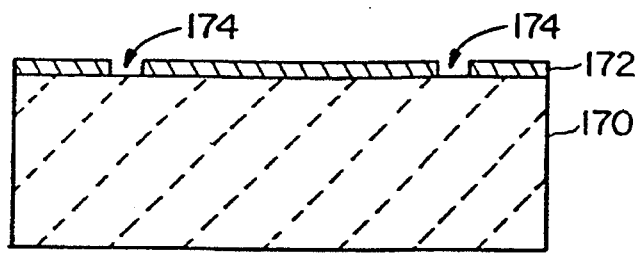
FIGS. 14A–14E illustrate a process for forming a crystallized silicon sensor device.
Figure 14B:
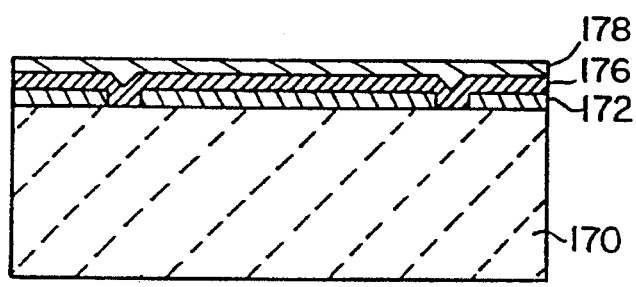
Figure 14C:
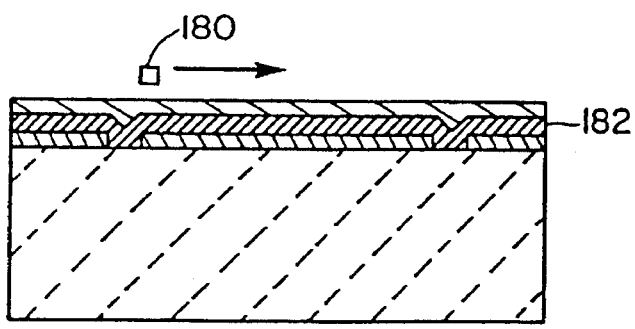
Figure 14D:
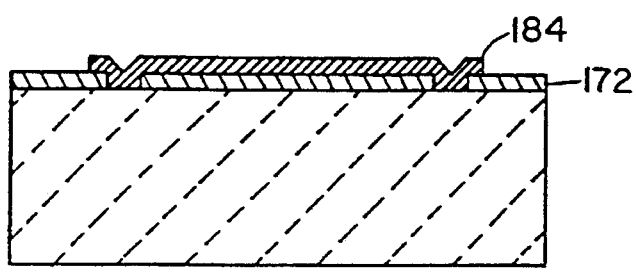
Figure 14E:
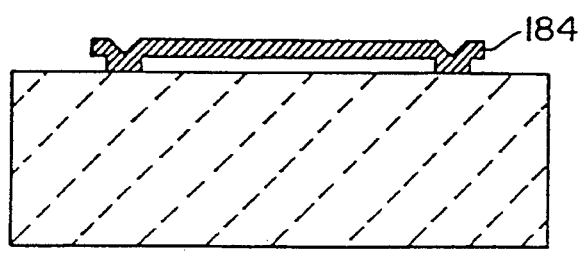

FIGS. 14A–14E illustrate a process sequence for a preferred method of making a silicon diaphragm sensor. First, as seen in FIG. 14A, a substrate 170 is oxidized to form layer 172 and patterned to form base support regions 174. In FIG. 14B, a polycrystalline silicon layer 176 is followed by a capping layer 178. Layer 176 is then zone-melt recrystallized using a scanning energy source 180 as shown in FIG. 14C to provide a single crystal silicon layer 182. In FIG. 14D, the structure is patterned to reveal the diaphragm structure 184. Finally, the oxide layer 172 is etched through the side openings to suspend the diaphragm 184.

Figure 15A:
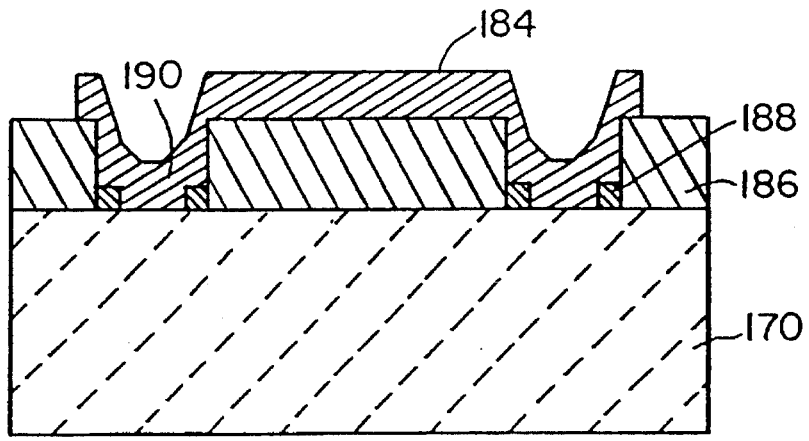
FIGS. 15A and 15B are side and top views of a diaphragm sensor.
Figure 15B:
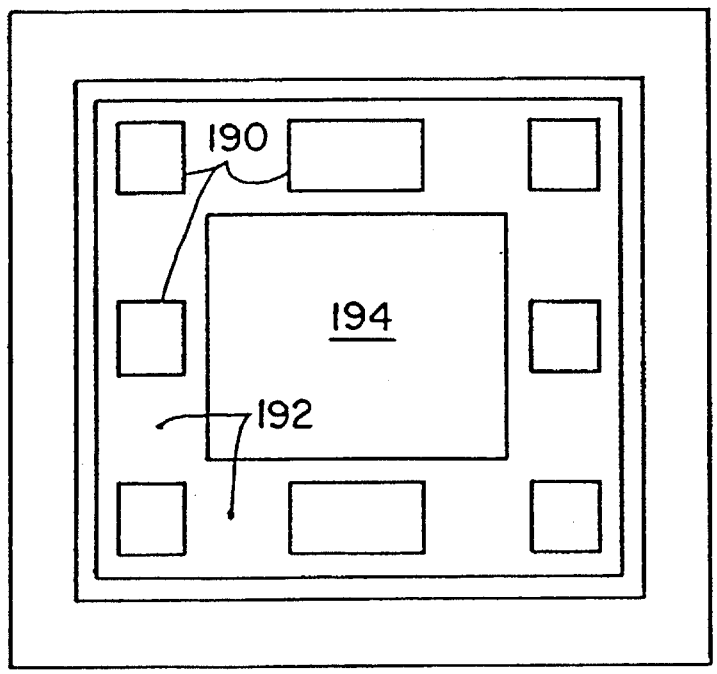

FIGS. 15A and 15B show more detailed side cross-sectional and top views of a structure fabricated using the process shown in FIGS. 14A–E. Base support regions 190 are used to support diaphragm 184. First 186 and second 188 oxide regions are used to facilitate processing. Regions 192 and 194 are undercut to suspend the diaphragm structure.

Figure 16:
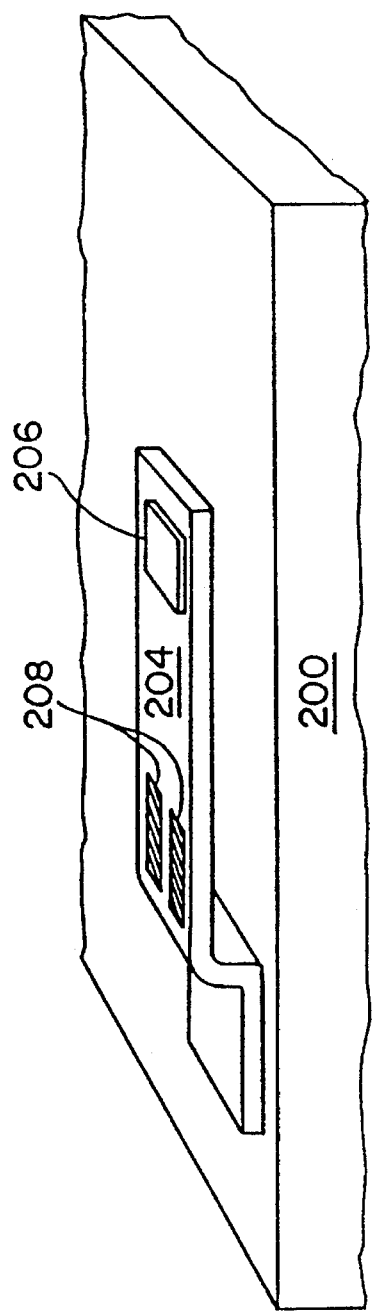
FIG. 16 is a perspective view of a cantilever accelerometer.
Figure 17:
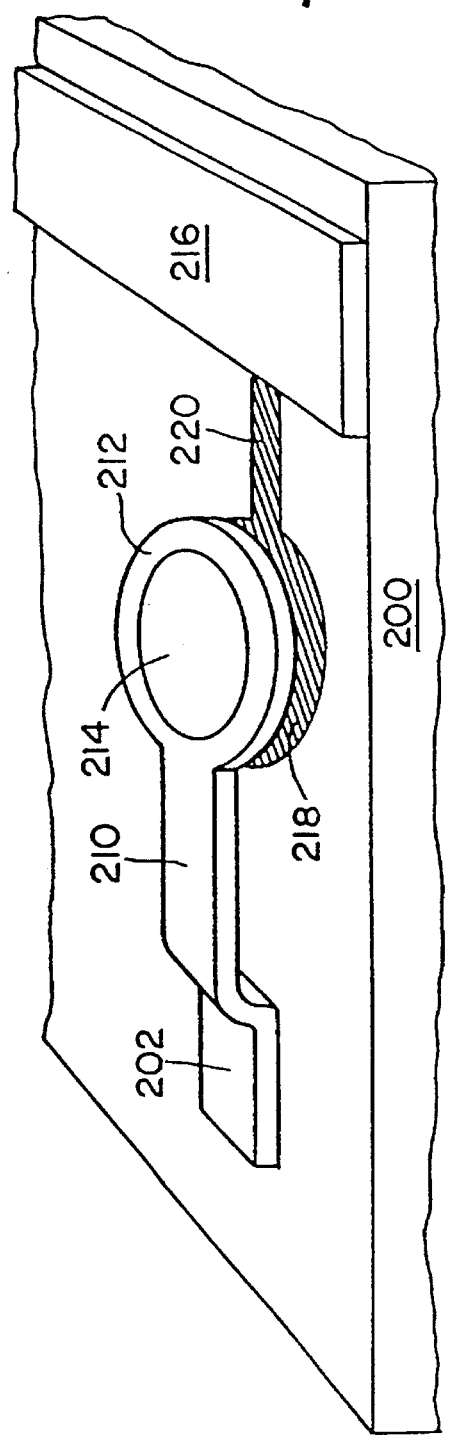
FIG. 17 is a perspective view illustrating capacitive type accelerometer.

FIGS. 16 and 17 illustrate cantilever devices that have been fabricated using the methods outlined above to form accelerometers. FIG. 16 shows a beam 204 of single crystal silicon mounted at base 202 onto substrate 200. Diffused or implanted piezoresistors 208 are formed in the beam which has a mass 206 mounted on the free end. Due to the use of a single crystal beam 204 the piezoresistors are about three times more sensitive than polysilicon structures.

FIG. 17 shows a capacitive type accelerometer having a generally circular free end 212 for beam 210 with mass 214 mounted thereon. A diffused silicon electrode 218 can be formed in the substrate 200 that is connected through channel 220 with sensor circuit 216 that is formed in an epitaxial layer overlying the substrate 200.

Figure 18A:
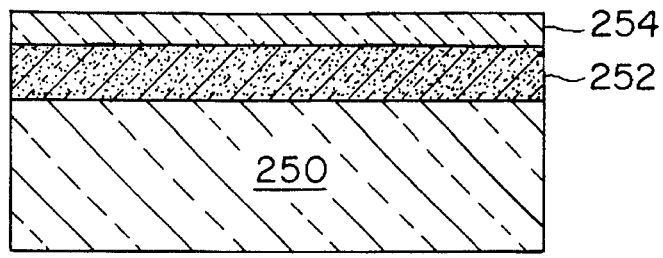
FIGS. 18A–18H illustrate another preferred method of fabricating a capacitive sensor in which the silicon layer is used as the sensor diaphragm.

FIGS. 18A–18H is another preferred sensor fabrication process in which a silicon diaphragm is supported in a capacitive pressure sensor. Referring to FIG. 18A, an SOI structure or wafer is formed in accordance with any of the previously explained fabrication techniques. In a preferred embodiment, a substrate 250 is oxidized to form an oxide layer 252. A polycrystalline layer 254 is formed over the oxide layer 252. Next, the layer 254 is recrystallized using any of the aforementioned techniques to provide a single crystal or substantially single crystal film. As explained previously, the film is suitable for the fabrication of high density CMOS circuits and piezoresistive elements.

Figure 18B:
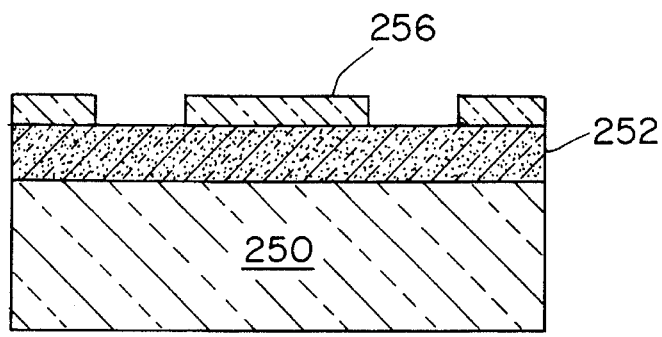
Figure 18C:
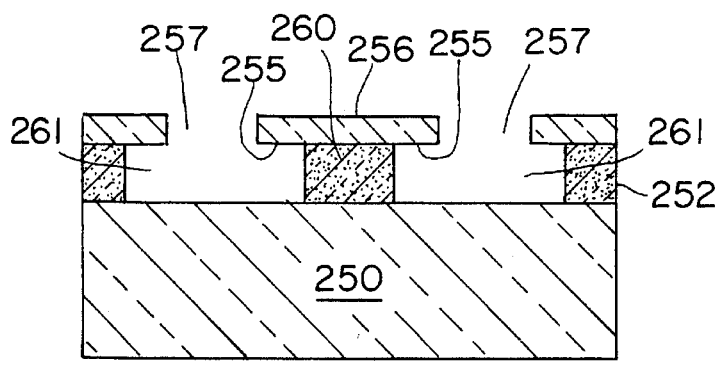
Figure 18D:
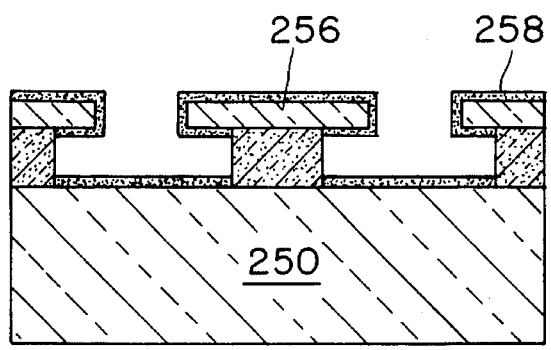
Figure 18E:
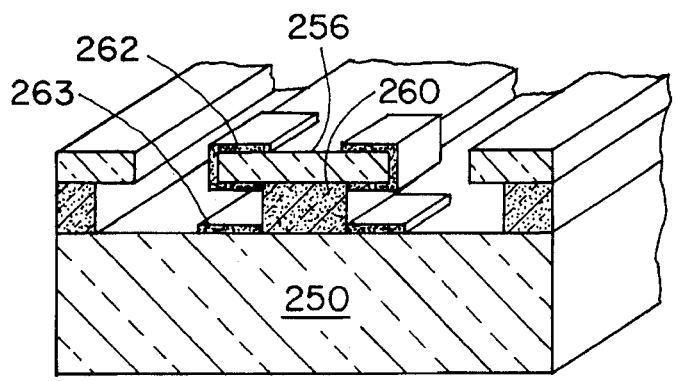

As shown in FIG. 18B, the film is etched to form a silicon diaphragm 256. The oxide layer 252 is then etched through the openings 257 in the film using an HF etchant or a plasma etch as shown in FIG. 18C. The oxide etching process includes undercutting the diaphragm at regions 255 in the range of about 0.2 to 10 microns, thereby suspending the diaphragm 256 on a section 260 of the oxide layer. Referring to FIG. 18D, the wafer is then reoxidized to form a thin oxide layer 258 on the silicon regions. The thin oxide layer is then patterned and etched to form isolated oxide regions 262 and 263 as shown in FIG. 18E.

Figure 18F:
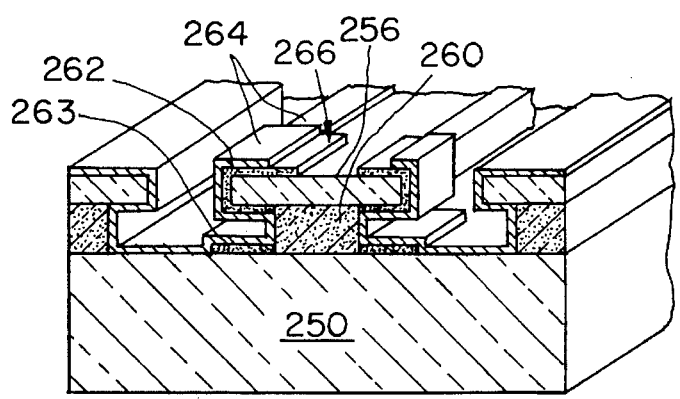
Figure 18G:
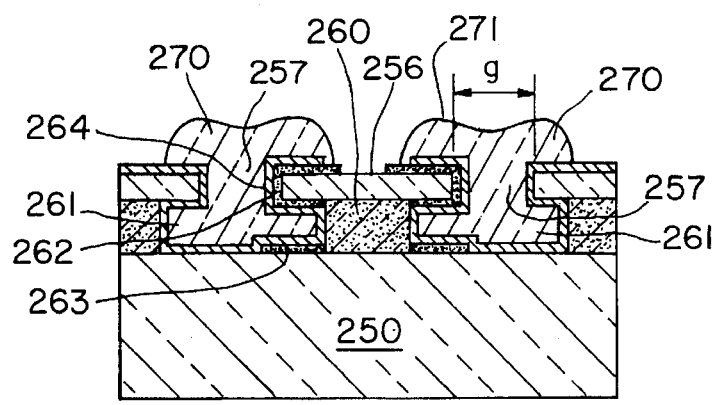
Figure 18H:
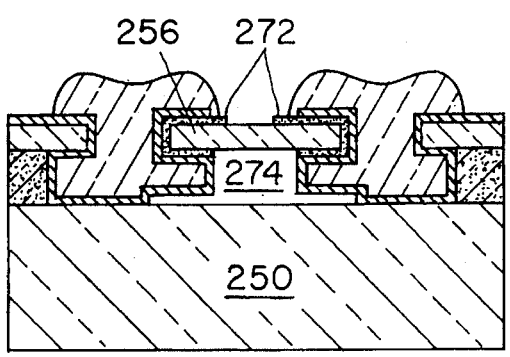

A thin layer of silicon nitride is then deposited, preferably using an LPCVD process, as shown in FIG. 18F. The silicon nitride layer 264 is then patterned which includes removing the nitride at a region 266 for exposing a portion of the oxide layer 262. Referring to FIG. 18G, polysilicon is deposited over the wafer and patterned to form thick polysilicon clamps 270 extending through the openings 257 in the film and filling the channels 261. These clamps serve as a support structure for the diaphragm. In preferred embodiments the gap width (g) of each channel is less than about twice the thickness of the deposited polysilicon layer. For example, for a 2 micron blanket polysilicon deposition, the gap width is preferably about 4 microns. This feature ensures that the polysilicon clamps 270 formed in the channels 261 during the blanket deposition have a relatively level upper surface 271.

The wafer is then exposed to a concentrated HF etchant which first attacks the silicon oxide 262 layer and then attacks the oxide sections 260 and 263. Once the oxide is consumed, the HF is removed from the cavity 274 (FIG. 18H) as follows. After etching with HF, the wafer is thoroughly rinsed in deionized water. The water is subsequently replaced by alcohol. The alcohol rinsing continues to ensure as complete a displacement as is reasonable. The alcohol-wet wafer is then placed under vacuum for a time sufficient to remove by vaporization all the alcohol from beneath the diaphragm. The vapor pressure difference between the inside of the diaphragm and outside (vacuum) prevents the diaphragm from collapsing onto the substrate due to surface tension. Next, the openings about the diaphragm are sealed by forming an oxide layer 272 therein.

In this approach the silicon nitride, being known as a good electrical insulator, serves to electrically isolate the substrate 250 and the diaphragm in the sensor. As such, electrodes can be formed in or on the diaphragm and the substrate to provide a capacitive type pressure sensor. Another advantage to this approach is that a pressure sensor is fabricated in which the diaphragm is without underlying support posts. Employing the above-stated method, the pressure difference between the inside of the diaphragm and outside (vacuum) prevents the diaphragm from collapsing onto the substrate such that the diaphragm underlying supports are not necessary inside the cavity. It is noted that a portion of the clamps may extend under the cavity (FIG. 18H) in some embodiments such that the clamps provide support from above and below.

Figure 19A:
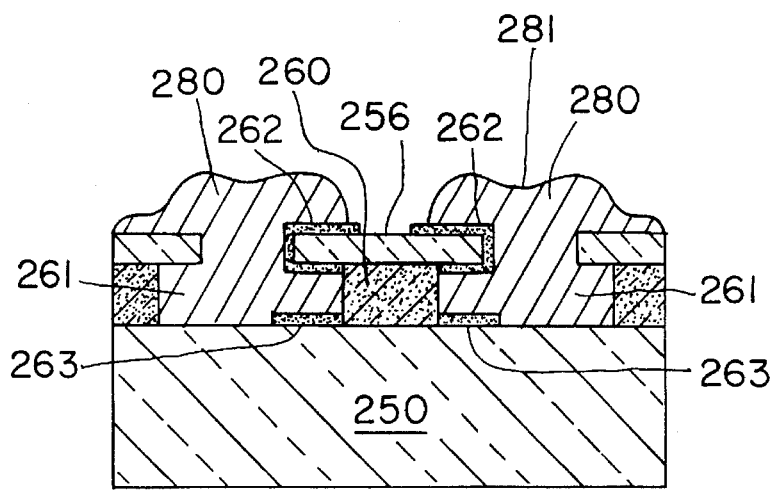
FIGS. 19A–19C illustrate another preferred method of fabricating a clamp using a nitride layer.
Figure 19B:
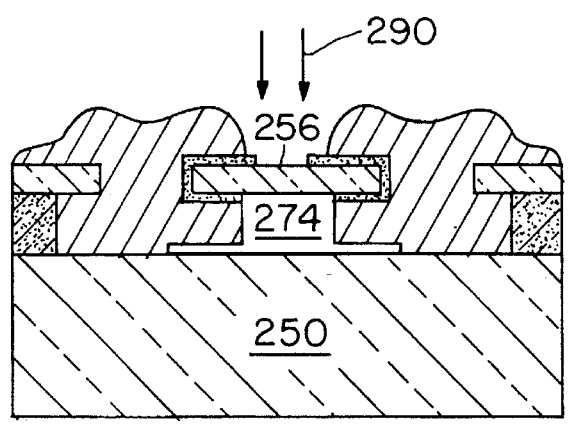
Figure 19C:
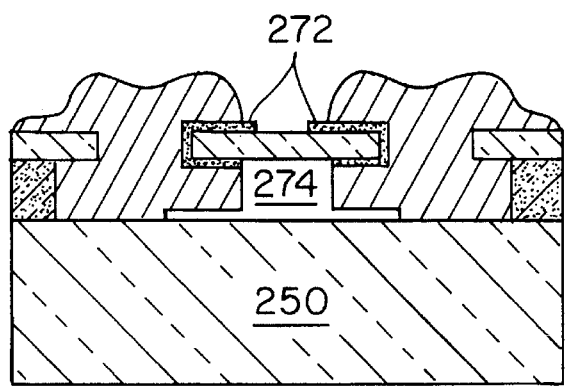

FIGS. 19A and 19B illustrate another preferred process for fabricating clamps. The clamps are fabricated after the isolated oxide regions 262, 263 are formed as shown in FIG. 18E. As shown in FIG. 19A, a single low stress nitride layer 280 is deposited. Unlike the embodiment illustrated in FIGS. 18F–H, a polysilicon deposition is not employed. The thickness of the nitride layer 280 is essentially equivalent to the combined thickness of the nitride 264 and the polysilicon 270 illustrated in FIGS. 18F–H. In this embodiment, the clamp comprises completely insulating material and provides even better capacitive insulation than the prior configuration. FIG. 19B illustrates the fabricated structure after etching. FIG. 19C illustrates the fabricated structure after the etch access has been filled by seal 272.

In all previously described uses of the clamp, it should be understood that the clamp serves two functions. The clamp supports the mechanical structure and also provides a well defined stop to prevent excessive undercutting of the mechanical structure as may occur without the clamp. For example, it is possible to fabricate a beam structure by simply defining an appropriate cavity and undercutting the structure. However, that process may result in a poorly defined boundary between mechanical ground and the beam. The exact position of that boundary varies depending upon etch conditions. Those boundary variations can be avoided by using a clamp. The clamp serves as an etch barrier and defines with much greater precision the boundary of the beam structure.

Figure 20:
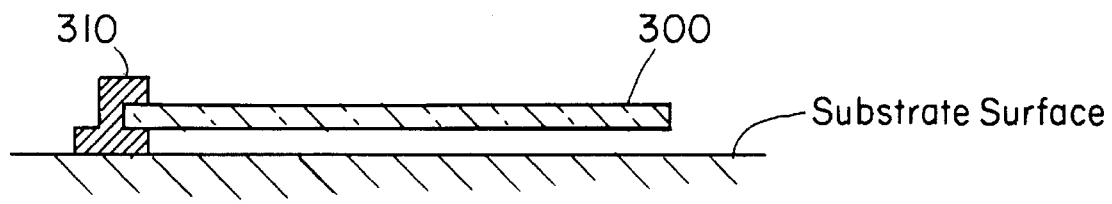
FIG. 20 illustrates a side view of a cantilever beam supported by a clamp.

It should also be noted that mechanical structures other than diaphragms are possible. These structures include bridges and cantilever beams, curved beams and bridges, beams, bridges and diaphragms with additional layers in various positions. FIG. 20 illustrates a side view of a cantilever beam 300 supported by a clamp 310.

Figure 21:
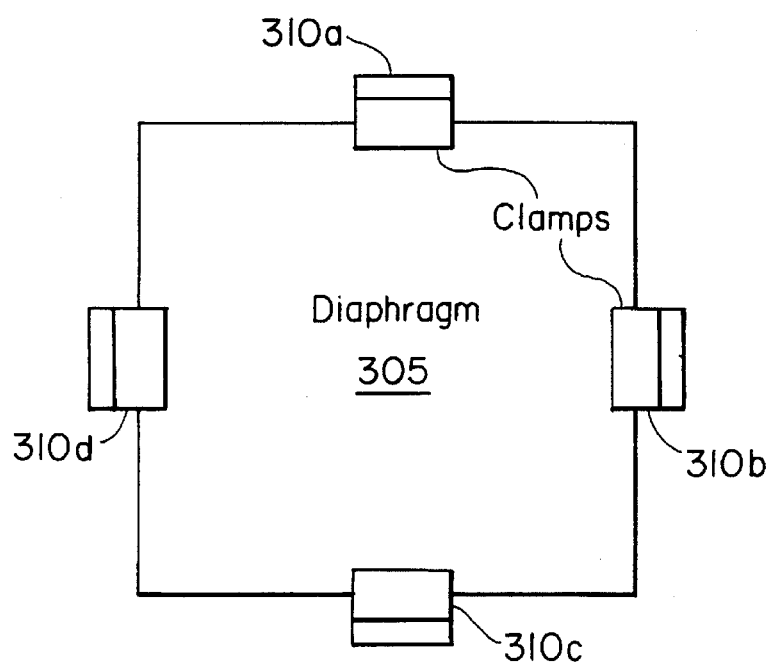
FIG. 21 illustrates a diaphragm supported by multiple clamps.

Multiple individual clamps may be used to support a single mechanical structure. A diaphragm, for example, may be supported by a number of clamps. The diaphragm may not be sealed around its edges. FIG. 21 illustrates a diaphragm 305 supported by multiple clamps 310a–d.

These structures may be used to fabricate a variety of micromechanical structures that may be used individually or in association with one another for sensors, actuators, or microminiature systems. Examples include individual actuators such as electromechanical switches or valves in sensors such as flow sensors, accelerometers, and pressure sensors. In all cases, high temperature capable electronics may be fabricated in the SOI material to drive, control or condition the appropriate signals.

Drying micromechanical structures can lead to problems that prevent them from performing in the way that was intended. Specifically, structures that are to suspend freely over the substrate are often found in contact with the substrate after drying. Several physical phenomena have been suggested as potential causes for this problem. One possible cause is the electrostatic potential that can exist between two different materials due to surface states and work function differences. Electrostatic forces can be large, especially over small distances, and these forces can bend the beam structure until it contacts the substrate. Another candidate cause is capillary action or surface tension, where the structure is drawn into contact with the substrate by surface tension as the liquid separating the structure and the substrate is removed. Typically, micromechanical structures are released after a sacrificial layer has been etched away. Following this etching process, the wafers are rinsed in water and dried. As the water dries, the microstructures can be drawn toward the substrate. The film of water remaining under the structure tends to exasperate the problem. In time, Van der Waals forces may take over.

This problem has been the impetus for considerable effort to find solutions. Several techniques for drying wafers have been proposed. One technique involves modifying the shape of the mechanical structure to help minimize the area that would come into contact with the substrate. In this approach, numerous downward protrusions of small area are placed on this structure. These protrusions may prevent the larger areas of the structure from coming into contact with the substrate, thus alleviating the problem to some extent. Another approach is to displace the water left after normal rinsing with another liquid. This other liquid is typically one that can be placed in a system suitably configured such that the liquid will solidify. When solid, conditions are changed, for example, by applying a vacuum, such that the solid material goes directly from the solid phase into the gaseous phase.

Cyclohexane is an example used in this freeze drying approach using liquid.

In a preferred embodiment of the invention, rapid evaporation is used to freely suspend a structure over the substrate using the pressure generated by evaporation to balance other forces acting on the structure. As shown in FIG. 19B, an alcohol or other liquid 290 is applied for evaporation into cavity 274. Based on a situation where surface tension draws the structures into contact with the substrate, a counteracting force is being used to hold the structure away from the substrate. This force is applied by rapidly evaporating gases that increase the pressure beneath the mechanical structure. The rate of evaporation can be varied by varying the temperature during the rapid vaporization. For example, single crystalline cantilever beams and bridges can be released by rapidly increasing the temperature of the wafer wetted with alcohol to 200° C. In an alternative embodiment, the wafer can be dried in a fluidized bed of methyl alcohol. An alcohol wetted wafer is passed through the floating liquid and onto a hot platen. The wafer initially cools the bath, which quickly recovers and is again fluidized with liquid floating over the wafer surface. At equilibrium, the wafer reaches a temperature near that of the hot platen. When removed from the fluidized methanol bed, the wafer is passed through the alcohol without re-wetting. When cooled, structures as long as 1 mm have been freely suspended over the substrate.

For a diaphragm, the liquid is confined to a much greater extent than with a beam or bridge. In surface micromachining processes, an etchant attacks the sacrificial layer through a small port. After rinsing the wafer in water, the water is displaced with methyl alcohol 290. The wet wafer is now heated more slowly on the hot platen. The vapor pressure inside the cavity forces the diaphragm away from the substrate. Care must be taken not to overpressurize the structures. The process continues until all liquid has been vaporized and the vapor has escaped from beneath the diaphragms through the etching ports.

While this invention has been particularly shown and described with reference to preferred embodiments thereof, it will be understood by those skilled in the art that various changes in form and details may be made therein without departing from the spirit and scope of the invention as defined by the appended claims.

We claim:

1. A pressure sensor comprising:

an insulating layer formed over a substrate, the insulating layer having a cavity formed therein;

a flexible diaphragm positioned over the cavity, the diaphragm being formed in a layer of single crystal or essentially single crystal silicon material positioned over a portion of the insulating layer and having a silicon-on-insulator structure; and an insulating clamp structure extending through the silicon layer and the insulating layer along a peripheral portion of the diaphragm, the clamp structure being positioned adjacent to the cavity and attached to the diaphragm for supporting the diaphragm over the cavity, the clamp structure being formed to support the diaphragm over the cavity.

2. The pressure sensor of claim 1 wherein the clamp structure comprises silicon nitride.

3. The pressure sensor of claim 1 wherein the clamp structure comprises polysilicon.

4. The pressure sensor of claim 1 wherein the insulating layer comprises silicon oxide.

5. The pressure sensor of claim 1 wherein the support substrate comprises a semiconductor material.

6. The pressure sensor of claim 5 wherein the semiconductor material is silicon.

7. The pressure sensor of claim 1 further comprising channels formed in the silicon layer adjacent to a peripheral portion of the diaphragm and in the insulating layer adjacent to the cavity, wherein the clamp is positioned in a channel adjacent to the cavity.

8. The pressure sensor of claim 1 wherein a portion of the cavity adjacent to the substrate has a cross-sectional area which is larger than a cross-sectional area of the diaphragm.

9. A pressure sensor comprising:

a semiconductor substrate;

a layer of insulating material formed on the substrate;

a layer of single crystal or essentially single crystal silicon material formed over the insulating layer and having a silicon-on-insulator structure;

a flexible diaphragm formed in the silicon layer and supported over a cavity formed in the insulating layer;

a channel formed through the layer of silicon material adjacent a peripheral portion of the diaphragm and into the insulating layer adjacent to the cavity; and a clamp structure formed in the channel, the clamp structure being attached to the diaphragm for supporting the diaphragm over the cavity and being formed of an electrical insulating material for electrically isolating the diaphragm from the substrate.

10. The pressure sensor of claim 9 wherein the clamp structure comprises silicon nitride.

11. The pressure sensor of claim 9 wherein the clamp structure comprises polysilicon.

12. The pressure sensor of claim 9 wherein the layer of insulating material comprises silicon oxide.

13. The pressure sensor of claim 9 wherein the semiconductor material is silicon.

14. The pressure sensor of claim 9 wherein a portion of the cavity adjacent to the substrate has a cross-sectional area which is larger than a cross-sectional area of the diaphragm.

15. A method of making a pressure sensor comprising the steps of:

forming an insulating layer on a substrate;

forming a layer of single crystal silicon over the insulating layer to provide a silicon-on-insulator structure;

forming a diaphragm positioned in or on the layer of single crystal silicon;

forming a clamp system extending through the silicon layer and the insulating layer along a peripheral portion of the diaphragm, the clamp system being attached to the diaphragm for supporting the diaphragm over a cavity to be formed in the insulator; and removing a portion of the insulating layer under the diaphragm to form the cavity such that the diaphragm can be displaced.

16. The method of step 15 wherein the step of forming a clamp system further comprises forming regions of silicon nitride.

17. The method of step 15 wherein the step of forming a clamp system further comprises forming regions of polysilicon.

18. An electromechanical device comprising:

a supporting substrate;

an insulating layer formed on the substrate, the insulating layer having a cavity formed therein;

a micromechanical structure positioned over the cavity, the micromechanical structure formed in a layer of single crystal or essentially single crystal silicon material positioned on the insulating layer and having a silicon-on-insulator structure; and an insulating clamp extending through the silicon layer and the insulating layer at a supporting location of the micromechanical structure, the clamp being formed of an electrical insulator for electrically isolating the micromechanical structure from the substrate.

19. The electromechanical device of claim 18 wherein the clamp comprises silicon nitride.

20. The electromechanical device of claim 18 wherein the micromechanical structure is a bridge.

21. The electromechanical device of claim 18 wherein the micromechanical structure is a beam.

22. The electromechanical device of claim 21 wherein the beam is a cantilever beam.

23. The electromechanical device of claim 18 wherein the insulating layer comprises silicon oxide.

24. The electromechanical device of claim 18 wherein the support substrate comprises a semiconductor material.

25. The electromechanical device of claim 24 wherein the support substrate is silicon.

* * * * *